United States Patent
Fujii

(10) Patent No.: US 7,576,869 B2
(45) Date of Patent: Aug. 18, 2009

(54) THREE-DIMENSIONAL SHAPE MEASUREMENT METHOD AND THREE-DIMENSIONAL SHAPE MEASUREMENT APPARATUS

(75) Inventor: Akihiro Fujii, Hino (JP)

(73) Assignee: Olympus Corporation, Tokyo (JP)

(\*) Notice: Subject to any disclaimer, the term of this patent is extended or adjusted under 35 U.S.C. 154(b) by 127 days.

(21) Appl. No.: 11/820,147

(22) Filed: Jun. 18, 2007

(65) Prior Publication Data

US 2008/0123103 A1  May 29, 2008

(30) Foreign Application Priority Data

Jun. 21, 2006 (JP) .............................. 2006-171782

(51) Int. Cl.
*G01B 11/02* (2006.01)
(52) U.S. Cl. ...................................... 356/511; 356/497
(58) Field of Classification Search ................. 356/497, 356/511–514
See application file for complete search history.

(56) References Cited

U.S. PATENT DOCUMENTS 5,133,601 A    7/1992  Cohen et al.
6,501,553 B1*  12/2002 Ogawa et al. ............... 356/512
2008/0111996 A1* 5/2008 Takeda et al. ............... 356/511

FOREIGN PATENT DOCUMENTS

JP    2007-033216    2/2007

OTHER PUBLICATIONS

S.C. Chim, Stanley et al., "Three-dimensional image realization in interference microscopy" Applied Optics/vol. 31, No. 14, May 10, 1992.

\* cited by examiner

*Primary Examiner*—Michael A Lyons
(74) *Attorney, Agent, or Firm*—Scully, Scott, Murphy & Presser, P.C.

(57) ABSTRACT

The present invention provides a three-dimensional shape measurement method and a three-dimensional shape measurement apparatus. Color luminance data I (x, y) is separated by an arithmetic processing unit into R, G and B which are color components of a color image. Then, maximum amplitude values are calculated, and the maximum values are composed to obtain an in-focus color omnifocal image. Further, a Z-position corresponding to the maximum amplitude value in an interferogram is calculated in at least one color component, and this processing is performed for all pixels (x, y) to calculate height information for a sample. The height information is provided to the color omnifocal image, such that the three-dimensional shape of the sample can be measured.

20 Claims, 14 Drawing Sheets

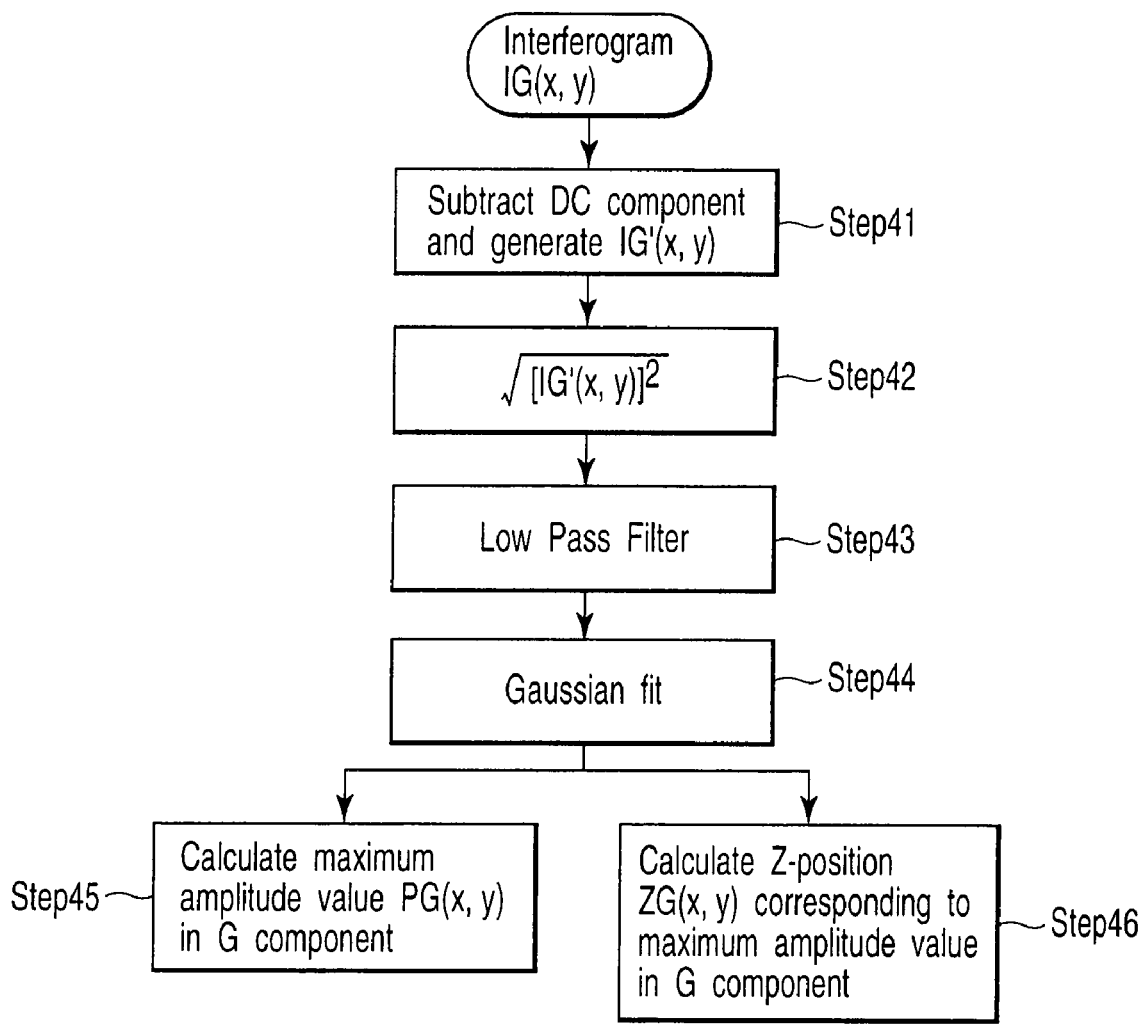
F I G. 12

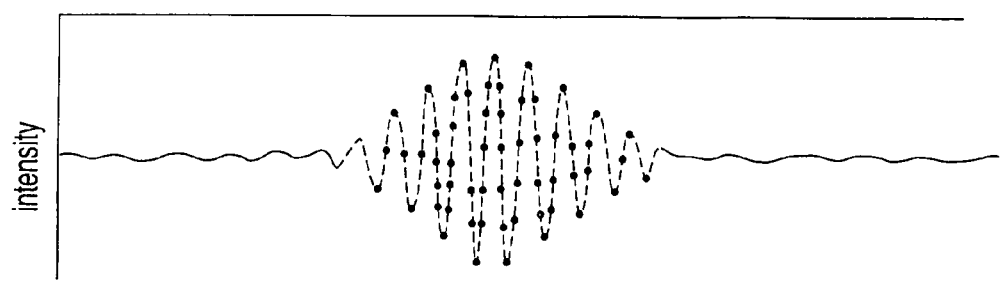
F I G. 1 3
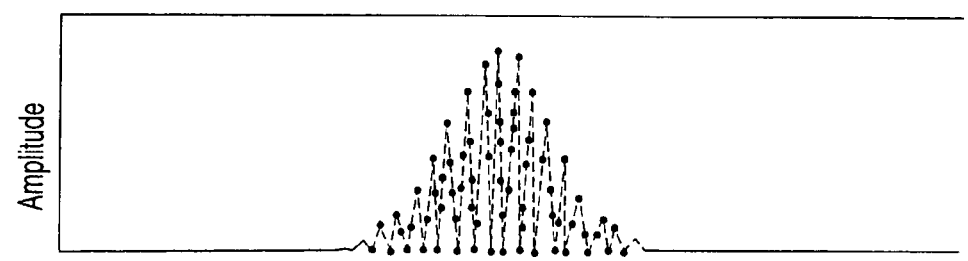
F I G. 1 4
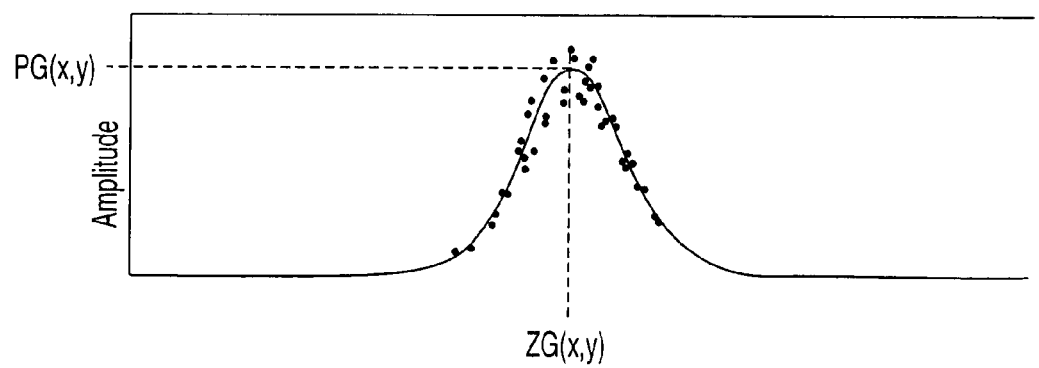
F I G. 1 5

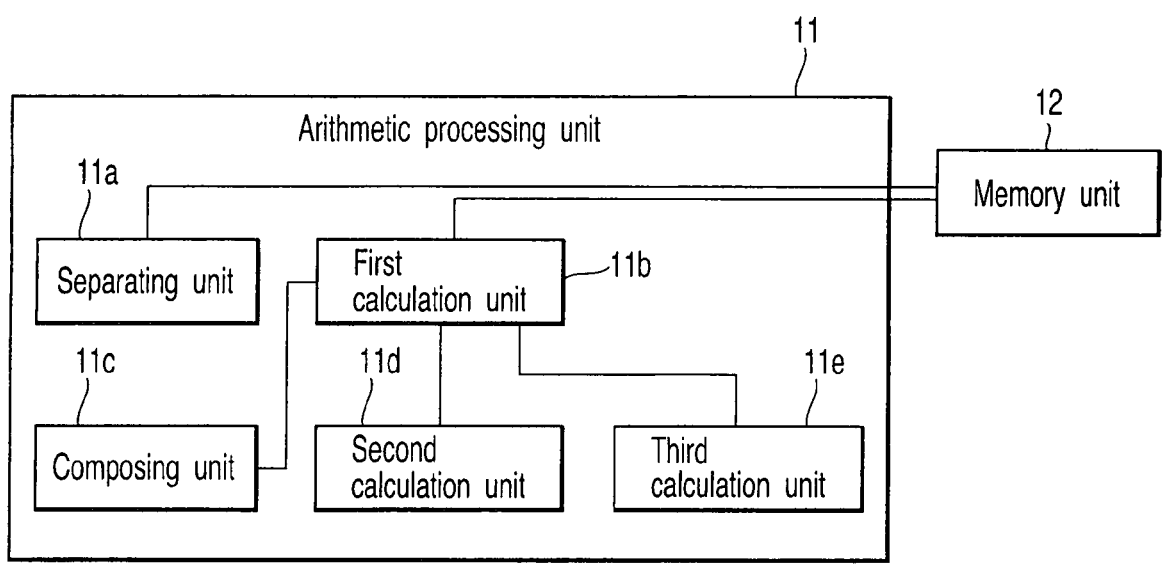
F I G. 20 A

THREE-DIMENSIONAL SHAPE MEASUREMENT METHOD AND THREE-DIMENSIONAL SHAPE MEASUREMENT APPARATUS

CROSS-REFERENCE TO RELATED APPLICATIONS

This application is based upon and claims the benefit of priority from prior Japanese Patent Application No. 2006-171782, filed Jun. 21, 2006, the entire contents of which are incorporated herein by reference.

BACKGROUND OF THE INVENTION

1. Field of the Invention

The present invention relates to a three-dimensional shape measurement method and a three-dimensional shape measurement apparatus for acquiring height information for a sample and a color omnifocal image thereof.

2. Description of the Related Art

A microscope interferometer measurement method is generally known as a method of measuring the three-dimensional shape of a micro-sample with high precision. For example, in a microscope interferometer measurement method disclosed in the specification of U.S. Pat. No. 5,133,601, light having a wide wavelength band emitted from a white light source (e.g., a halogen lamp or mercury lamp) is applied to a sample by an interference objective lens. In this microscope interferometer measurement method, an interference figure is imaged in which light (hereinafter, measurement light) reflected from the sample interferes with light (hereinafter, reference light) reflected from a reference surface provided in the interference objective lens, thereby acquiring an interference image.

The interference objective lens includes a Michelson-type interference objective lens, a Mirau-type interference objective lens, etc. In both the Michelson-type interference objective lens and the Mirau-type interference objective lens, reference optical paths are formed by beam splitters provided in these interference objective lenses. In this reference optical path, a reference surface is provided at a position conjugate with an object side focal position of the interference objective lens.

The light source emits white light, that is, light having a short coherence length. Thus, the intensity of the interference is maximized when an optical path difference between the measurement light and the reference light is zero. The reference surface is disposed at a position conjugate with the object side focal position of the interference objective lens. Thus, the optical path difference becomes zero, that is, the interference intensity is maximized when the sample is in focus. The interference intensity decreases as the optical path difference increases along with a change in the relative distance between the interference objective lens and the sample. The region which permits the measurement of the change of interference intensity generally has a significantly small optical path difference of several micrometers or less, and this nature is used to measure the height (height information) of the sample.

That is, an image pickup unit (hereinafter, an image pickup device) sequentially acquires interference images of the sample every time a drive unit causes the interference objective lens to scan (move) in an optical axis direction (hereinafter, a Z-direction). A control unit obtains a position in the optical axis direction at which the interference intensity is maximized for all the interference images picked up by the image pickup device. This permits the three-dimensional shape of the sample to be obtained.

Here, a luminance transition curve (an interference pattern in the form of waveforms (interference waveforms)) acquired by the control unit when the interference objective lens scans in the Z-direction is generally referred to as an interferogram. This interferogram is shown in FIG. 22.

The envelope (a broken line shown in FIG. 22) of the interferogram is determined by the coherence length of the light source. Periodic changes within the envelope are attributed to the interference of light, and their period is about $\lambda/2$ where $\lambda$ is the centroid wavelength of the light source.

Methods of obtaining a position where the interference intensity is maximized from this interferogram include, for example, the method using a low pass filter disclosed in the specification of U.S. Pat. No. 5,133,601, and a method using Hilbert transformation disclosed in Applied Optics/Vol. 31, No. 14/10 May 1992 "Three-dimensional image realization in interference microscopy".

However, conventional apparatuses using the methods mentioned above are limited to the acquisition of the height information alone, and are not capable of obtaining information on the color of the sample, the difference of reflectance, etc. For example, when samples have the same height but are formed of different compositions, the conventional apparatuses using the methods described above are not capable of recognizing the difference of compositions from information on the measured heights because they can not obtain the information on the color of the sample, the difference of reflectance, etc.

Furthermore, the sample has ultramicroscopic irregularities when the sample has micro-flaws or when dust, etc., in the atmosphere sticks to the sample. If the image pickup device is not capable of sufficient spatial sampling of the ultramicroscopic irregularities, information on the height of ultramicroscopic parts is not detected and is overlooked.

Moreover, when attention is focused on one interference image used in the height measurement, the reference light is superposed on an imaging area in the interference image. Therefore, the interference image looks like an image having uniform flare light. Thus, the interference image is an observation image having lower contrast than that of an image obtained by a general optical microscope, and is not sufficient for the quality of a luminance image.

BRIEF SUMMARY OF THE INVENTION

According to an aspect of the invention, there is provided a three-dimensional shape measurement method which applies light emitted from a light source to a sample and a reference surface and which images a figure from lights reflected from the sample and the reference surface to measure the three-dimensional shape of the sample, the method comprising: adjusting the relative distance between the sample and the reference surface; sequentially imaging the interference figures to acquire an interference image every time the relative distance is changed; separating the acquired interference image into color components; calculating a maximum amplitude value from an interference waveform for each of the separated color components; and composing the calculated maximum amplitude values to generate color luminance data.

According to another aspect of the invention, there is provided a three-dimensional shape measurement method which applies light emitted from a light source to a sample and a reference surface and which images an interference figure from lights reflected from the sample and the reference surface to measure the three-dimensional shape of the sample, the method comprising: adjusting the relative distance between the sample and the reference surface; sequentially imaging the interference figures to acquire color interference images every time the relative distance is changed; separating the acquired color interference images for the latest m frames into color components; calculating the amplitude of the latest frame for each color component from an interference waveform for the latest m frames for each of the separated color components; calculating a maximum value of the amplitude for each color component; and composing the calculated maximum amplitude values to generate color luminance data.

According to another aspect of the invention, there is provided a three-dimensional shape measurement apparatus which applies light emitted from a light source to a sample and a reference surface and which images a figure from lights reflected from the sample and the reference surface to measure the three-dimensional shape of the sample, the apparatus comprising: a drive unit which adjusts the relative distance between the sample and the reference surface; an image acquisition unit which sequentially images interference figures to acquire color interference images every time the relative distance is changed by the drive unit; a separating unit which separates the color interference image acquired by the image acquisition unit into color components; a first calculation unit which calculates a maximum amplitude value for each color component from an interference waveform of the color components separated by the separating unit; and a composing unit which composes the maximum amplitude values for the color components to generate the color interference image.

According to another aspect of the invention, there is provided a three-dimensional shape measurement apparatus which applies light emitted from a light source to a sample and a reference surface and which images a figure from lights reflected from the sample and the reference surface to measure the three-dimensional shape of the sample, the apparatus comprising: a drive unit which adjusts the relative distance between the sample and the reference surface; an image acquisition unit which sequentially images the interference figures to acquire color interference images every time the relative distance is changed by the drive unit; a separating unit which separates, into color components, the color interference images for the latest m frames acquired by the image acquisition unit; a first calculation unit which calculates the amplitude of the latest frame for each color component from an interference waveform for the latest m frames for each of the color components separated by the separating unit; a second calculation unit which calculates a maximum value of the amplitude for each color component; and a composing unit which composes the maximum amplitude values for the color components to generate the color interference image.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is a flowchart for calculating a maximum amplitude value and a Z-position (relative distance) corresponding to the maximum amplitude value using a low pass filter;

FIG. 13 is a graph showing a curve joining subtracted color luminance data IG' (x, y) generated in Step 41 shown in FIG. 12;

FIG. 14 is a graph obtained by substituting the subtracted color luminance data IG' (x, y) in an expression;

FIG. 15 is a graph displayed when gauss fit is provided;

FIG. 20A is a diagram of the configuration of an arithmetic processing unit in a second modification;

DETAILED DESCRIPTION OF THE INVENTION

A first embodiment according to the present invention will hereinafter be described in detail with reference to the drawings.

Figure 1A:
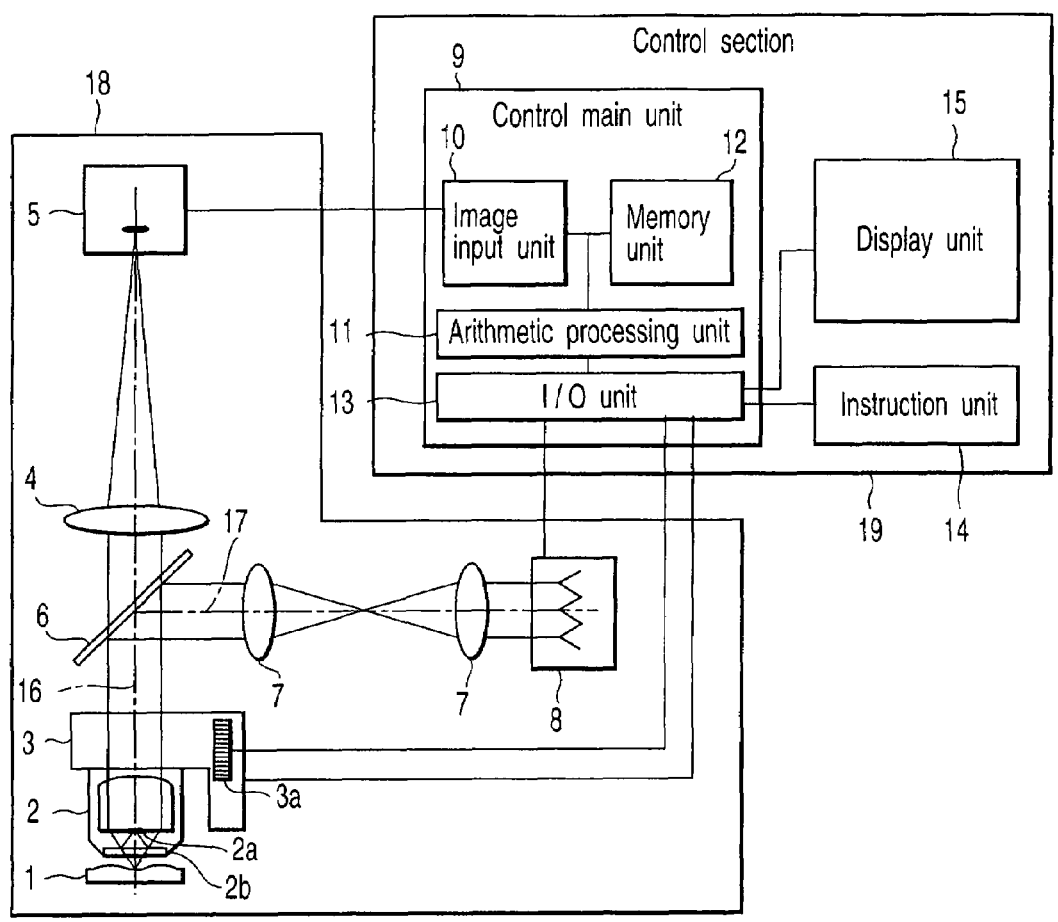
FIG. 1A is a diagram of the configuration of a three-dimensional shape measurement apparatus according to a first embodiment of the present invention.
Figure 1B:
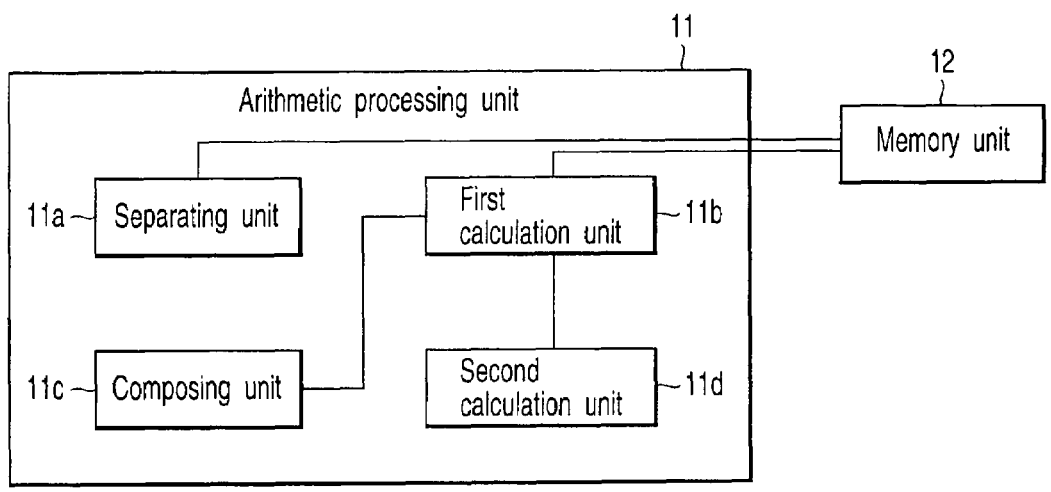
FIG. 1B is a diagram of the configuration of an arithmetic processing unit in the present embodiment.

FIG. 1A is a diagram of the configuration of a three-dimensional shape measurement apparatus according to the first embodiment of the present invention. FIG. 1B is a diagram of the configuration of an arithmetic processing unit in the present embodiment. The three-dimensional shape measurement apparatus in the present embodiment roughly has a Mirau-type interference microscope section 18 and a control section 19. In addition, the present embodiment uses a Mirau-type interference optical system as an example, but the same basic configuration, operation and effects are also provided by a Michelson-type interference optical system.

In the Mirau-type interference microscope section 18, there are sequentially arranged a white light source 8 for emitting light, an illumination optical system 7 which is composed of a plurality of lenses and which transmits the light emitted from the white light source 8, and a half mirror 6 which reflects the light transmitted by the illumination optical system 7 downward (to an interference objective lens 2) and which transmits light reflected from a sample 1.

Moreover, in the Mirau-type interference microscope section 18, there are sequentially arranged, on a reflection optical path of the half mirror 6, the interference objective lens 2 which condenses lights reflected by the half mirror 6 onto the sample 1 and a reference mirror surface 2a, and a Z-scan mechanism 3 which causes the interference objective lens 2 to scan (move) along an optical axis 16.

The sample 1 is mounted on an unshown stage. The sample 1 is disposed opposite to the interference objective lens 2. The interference objective lens 2 condenses light emitted from the white light source 8 onto the sample 1.

Furthermore, in the Mirau-type interference microscope section 18, there are arranged, on a transmission optical path of the half mirror 6, an imaging lens 4 which condenses light reflected from the sample 1 and the reference mirror surface 2a and transmitted by the interference objective lens 2 and the half mirror 6 and in order to form an image of the sample 1, and a color image pickup device 5 which is disposed at a focal position of the imaging lens 4 and which captures an interference figure (hereinafter, a figure) of the sample 1. The light reflected from the sample 1 and the light reflected from the reference mirror surface 2a interfere with each other.

Thus, the Mirau-type interference microscope section 18 forms an incident-light illumination optical system.

The white light source 8 which is an incoherent light source is, for example, a halogen lamp for emitting light having a wide visible wavelength band.

The interference objective lens 2 has the reference mirror surface 2a and a beam splitter 2b therein, and forms Mirau-type interference objective lens. The beam splitter 2b transmits one of the lights reflected by the half mirror 6 toward the sample 1, and reflects the other toward the reference mirror surface 2a. The reference mirror surface 2a again reflects this light toward the beam splitter 2b. The beam splitter 2b transmits the light reflected from the sample 1 toward the imaging lens 4, and transmits the light reflected from the reference mirror surface 2a toward the imaging lens 4.

The Z-scan mechanism 3 uses a stacked piezoelectric member (not shown) as an actuator for a uniaxial stage having an elastic spring guide (not shown). Inside the Z-scan mechanism 3, a displacement sensor 3a is provided which measures a displacement amount when the interference objective lens 2 has moved along the optical axis 16.

The color image pickup device 5 (image acquisition unit) is a single- or triple-sensor CCD camera capable of sensing red, green and blue (hereinafter, R, G and B) light component by component.

Figure 2:
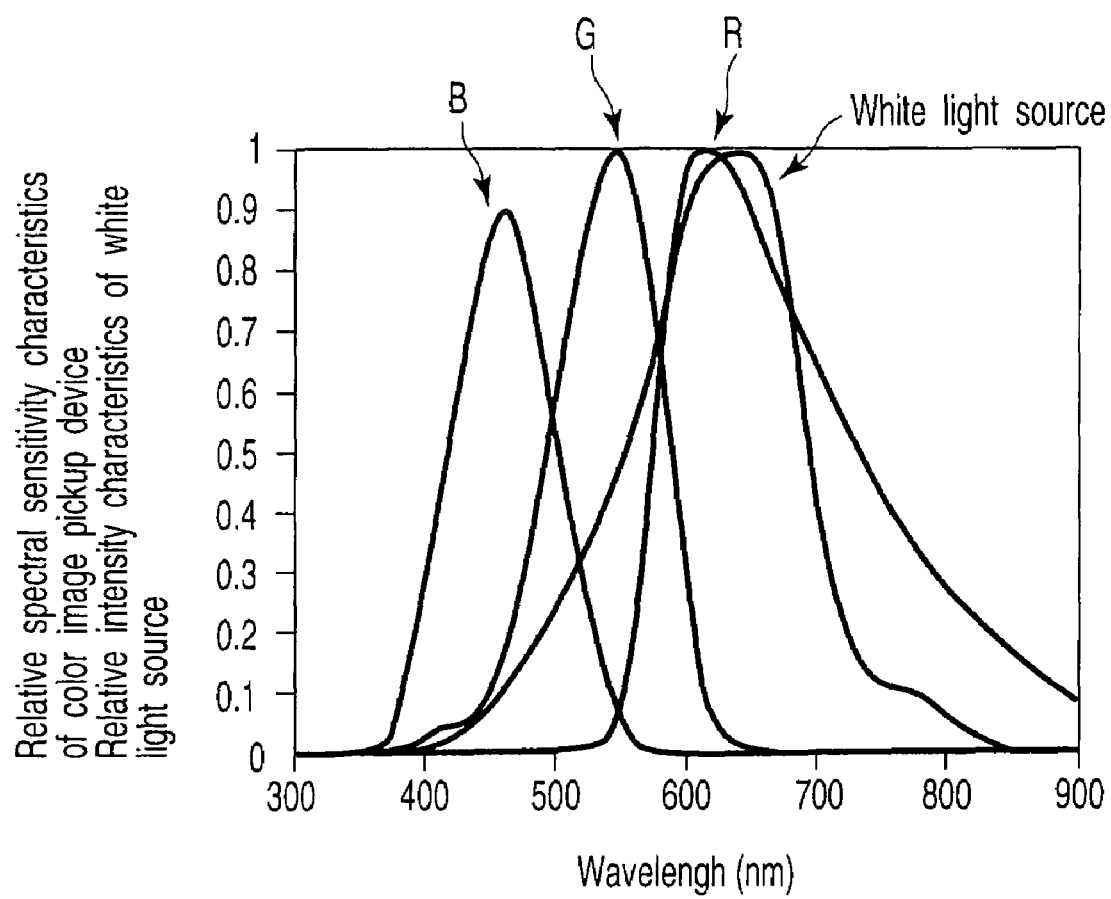
FIG. 2 is a diagram showing one example of the relation between relative spectral sensitivity characteristics of a color image pickup device and the wavelength and the relation between relative intensity characteristics of a light emission spectrum of a white light source and the wavelength.

FIG. 2 shows one example of the relation between relative spectral sensitivity characteristics of the color image pickup device and the wavelength and the relation between relative intensity characteristics of a light emission spectrum of the white light source and the wavelength.

The control section 19 has a control main unit 9, an instruction unit 14 and a display unit 15. The control main unit 9 has an image input unit 10, an arithmetic processing unit 11, a memory unit 12 and an I/O unit 13.

The I/O unit 13 connects the instruction unit 14 (e.g., a keyboard and a mouse of a PC) by which a user performs various operations or gives various instructions, to the display unit 15 for displaying measurement results and operational screens. Further, the I/O unit 13 controls the white light source 8 and the Z-scan mechanism 3 in accordance with an instruction input from the instruction unit 14. Moreover, when the interference objective lens 2 has been moved along the optical axis 16 by the Z-scan mechanism 3 in accordance with the instruction of the instruction unit 14, the displacement amount of the interference objective lens 2 read by the displacement sensor 3a is input to the I/O unit 13.

The image input unit 10 imports a color interference image (hereinafter, image data) from the figure imaged by the color image pickup device 5.

The memory unit 12 memorizes the displacement amount, the image data, various calculation results, calculation parameters, etc.

The arithmetic processing unit 11 processes various calculations (images) on the basis of information output from the image input unit 10 and the memory unit 12. In order to process the various calculations (images), this arithmetic processing unit 11 has a separating unit 11a, a first calculation unit 11b, a composing unit 11c and a second calculation unit 11d, as shown in FIG. 1B. The separating unit 11a, the first calculation unit 11b, the composing unit 11c and the second calculation unit 11d will be described later.

Next, the operation of the three-dimensional shape measurement apparatus will be described with reference to a flowchart shown in FIG. 3.

The three-dimensional shape measurement apparatus is set to measure the sample 1.

First, the sample 1 is imaged by the color image pickup device 5, and displayed on the display unit 15 in real time. The measurement position, etc., of the sample 1 are adjusted so that a part of the sample 1 to be measured is brought into a measurement view field of the interference objective lens 2 (Step 1).

Next, the inclination of the sample 1 mounted on the stage is adjusted so that the sample 1 is substantially vertical relative to the optical axis 16 (the inclination of the stage is adjusted so that the inclination may be zero) (Step 2). The measurement position, etc., and the inclination are adjusted referring to the display unit 15. The inclination can be adjusted to zero by minimizing the number of interference fringes produced when the sample 1 is focused (a state generally called a null). This inclination adjustment is performed to increase the visibility of the interference fringes.

Next, the instruction unit 14 instructs the I/O unit 13 to adjust the brightness of the white light source 8 (Step 3). After the adjustment, the instruction unit 14 sets a zone on the surface of the sample 1 to be scanned by the Z-scan mechanism 3 (Step 4). Thus, a start position and an end position, that is, a Z-scanning zone are set for the Z-scan of the Z-scan mechanism 3. The operation described above completes the setting of the three-dimensional shape measurement apparatus for measuring the sample 1.

Next, the sample 1 is measured.

When the instruction unit 14 outputs an instruction to start the measurement, the interference objective lens 2 is moved to the Z-scan start position by the Z-scan mechanism 3 (Step 5).

The interference objective lens 2 is step-moved a distance (image pickup step distance) Δ preset as a measurement parameter from the Z-scan start position by the Z-scan mechanism 3 (Step 6). This image pickup step distance Δ is generally set to be less than λ/4 where λ is the central wavelength of the light source. After the interference objective lens 2 is moved by the Z-scan mechanism 3, the color image pickup device 5 images the figure of the sample 1 at this position. This image is acquired as image data by the image input unit 10. The image data is memorized in the memory unit 12 (Step 7).

Next, the control section 19 judges whether the interference objective lens 2 is moved by the Z-scan mechanism 3 to the Z-scan end position set in Step 4 (Step 8).

If the interference objective lens 2 is not moved to the Z-scan end position by the Z-scan mechanism 3 (Step 8: No), the flow again returns to Step 6, and the operation described above is repeated.

Thus, the operation of moving the interference objective lens 2 in the Z-axis direction (Step 6) and the image pickup operation by the color image pickup device 5 (Step 7) are alternately carried out up to the Z-scan end position.

Figure 4:
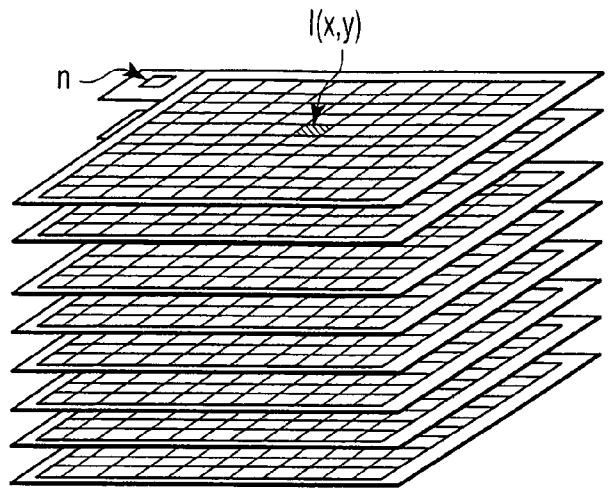
FIG. 4 is a conceptual diagram showing the relation between a plurality of step-by-step image data items memorized in a memory unit and frame numbers corresponding to the image data items.

As shown in FIG. 4, frame numbers n are assigned to the desired step-by-step image data items sequentially acquired by the color image pickup device and memorized in the memory unit 12.

When the frame numbers n and the image pickup step distance Δ are obtained, the arithmetic processing unit 11 can obtain a position (hereinafter, a Z-position) in the optical axis direction when the sample 1 is imaged. One image data item memorized in the memory unit 12 contains color luminance data I (x, y) corresponding to pixels of the color image pickup device 5. For example, in the case of a VGA image, x=1, 2, ... 640, and y=1, 2, ... 480.

In addition, the memory unit 12 memorizes the image data items to which the frame numbers n are assigned in the present embodiment, but may also memorizes image data items to which displacement amounts (Z-positions) measured by the displacement sensor 3a are assigned.

If the interference objective lens 2 is moved to the Z-scan end position by the Z-scan mechanism (Step 8: Yes), the arithmetic processing unit 11 performs image processing (Step 9). Height information for the sample 1 and a color omnifocal image thereof are calculated by this image processing.

Figure 5:
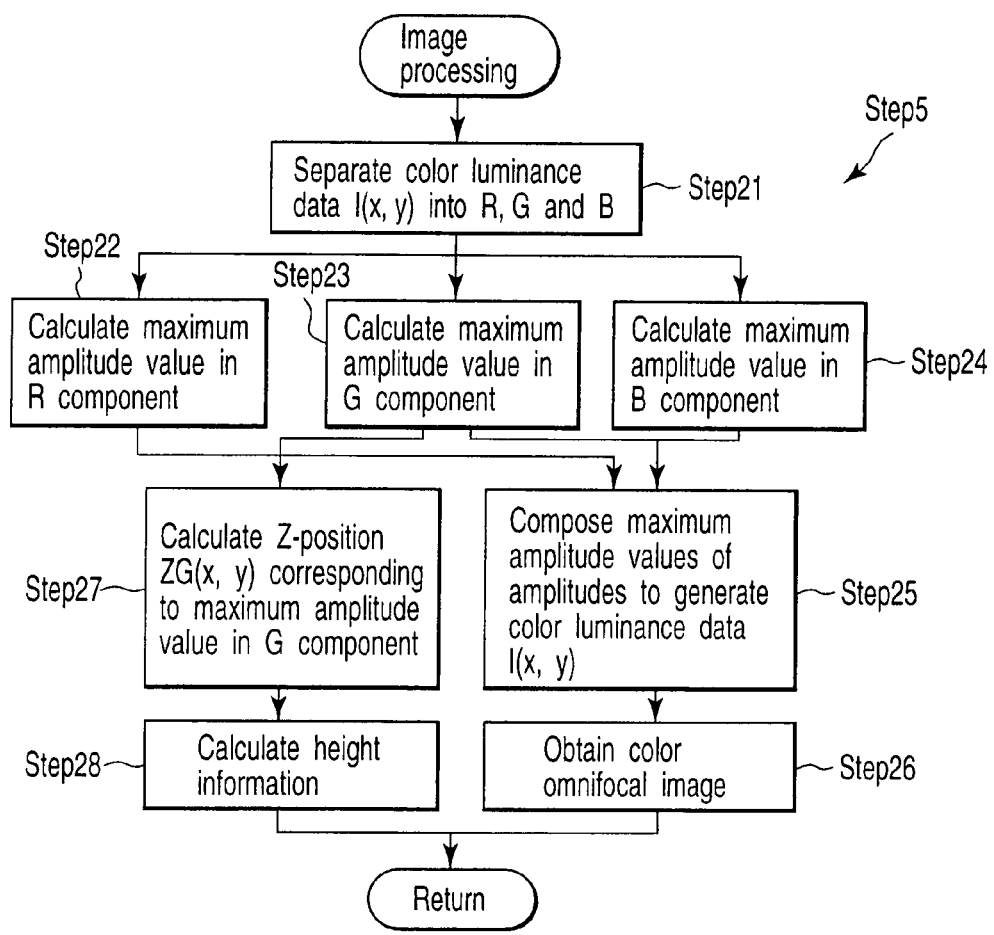
FIG. 5 is a subroutine in an image processing Step shown in FIG. 3.

The image processing in Step 9 will be described here in detail referring to a subroutine shown in FIG. 5.

The separating unit 11a separates the color luminance data I (x, y) contained in the data for one image into R, G and B which are color components of a color image (Step 21).

Next, the memory unit 12 memorizes separated R luminance data IR (x, y), G luminance data IG (x, y) and B luminance data IB (x, y).

Figure 6:
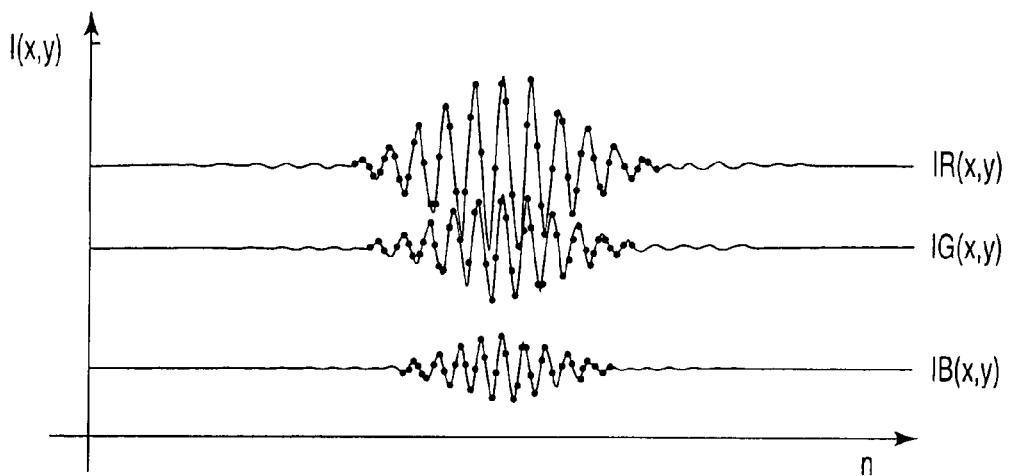
FIG. 6 is a diagram showing the relation (interferogram) between separated R luminance data IR (x, y), G luminance data IG (x, y) and B luminance data IB (x, y), and frame number n.

Here, the relation between the separated luminance data and the frame number n is shown in FIG. 6. As shown in FIG. 6, interference waveforms (interferograms) for R, G and B have signals with changed interference intensities.

Next, the first calculation unit 11b calculates a maximum amplitude value from the interferogram for R (Step 22). The first calculation unit 11b also calculates a maximum amplitude value from the interferogram for G (Step 23), and calculates a maximum amplitude value from the interferogram for B (Step 24). The first calculation unit 11b processes Step 22 to Step 24 in parallel.

After the calculation, the composing unit 11c composes the maximum amplitude values calculated in Step 22 to Step 24 to generate the color luminance data I (x, y) (Step 25).

Since the white light source 8 is used, the difference of luminance value among the interferograms for the respective colors is equal to color information, that is, the mixing ratio of RGB of the sample 1. The maximum amplitude values calculated in Step 22 to Step 24 are information on the intensity of light at focal positions. Therefore, in the maximum amplitude values for R, G and B in Step 22 to Step 24, the ratio of the maximum values is luminance information including information on the colors at an actual sample position for a target pixel (x, y). Thus, the composing unit 11c in the present embodiment composes the maximum amplitude values to generate the color luminance data I (x, y). The composing unit 11c also performs this processing for all the pixels (x, y). Thus, the arithmetic processing unit 11 can obtain a color omnifocal image (Step 26).

Furthermore, the second calculation unit 11d calculates a Z-position (relative distance) from the frame number corresponding to the maximum amplitude value of the interferogram in at least one (the G component in the present embodiment) of the color components (Step 27). The second calculation unit 11d performs calculation for all the pixels (x, y). Thus, the arithmetic processing unit 11 in the present embodiment can calculate the height information for the sample 1 (Step 28).

In addition, there are various methods of calculating the maximum amplitude values in Step 22 to Step 24, and various methods of calculating the relative distance corresponding to the maximum amplitude value in Step 28.

Such calculation methods include a method using Hilbert transformation (Applied Optics, Vol. 31, No. 14 (1992) "Three-dimensional realization in interference microscopy"), and a method using a low pass filter (the specification of U.S. Pat. No. 5,133,601).

Figure 7:
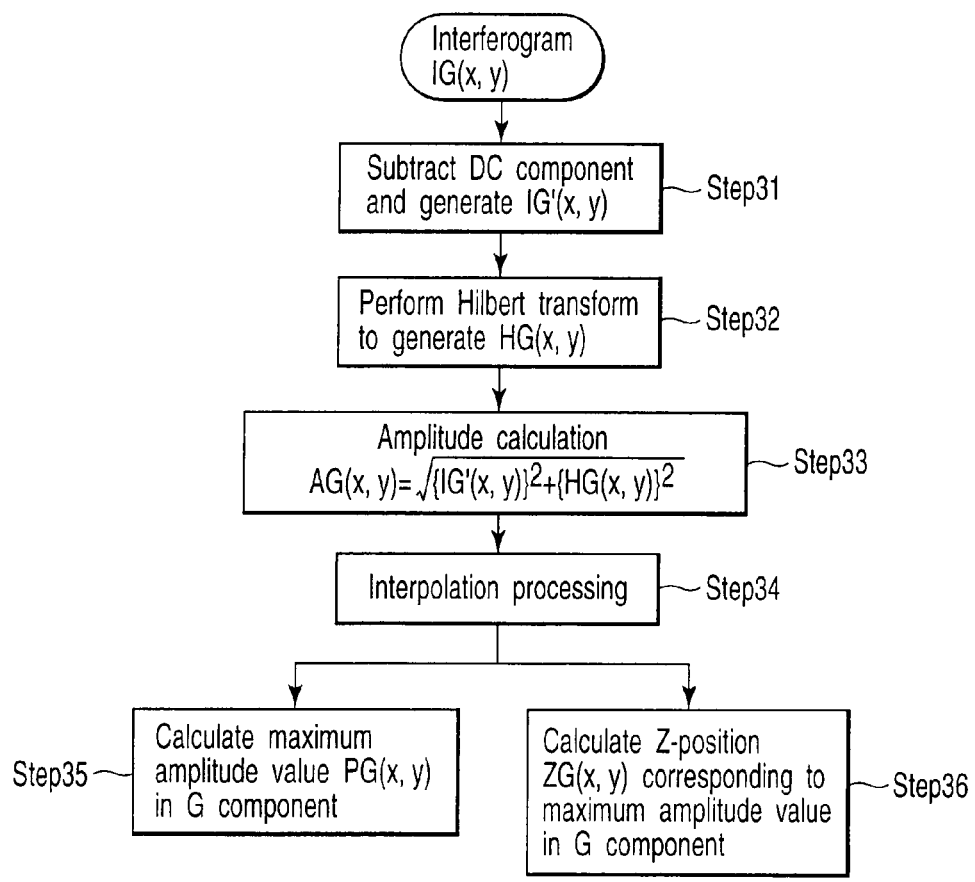
FIG. 7 is a flowchart for calculating a maximum amplitude value and height information using Hilbert transform.

Therefore, referring to FIG. 7 to FIG. 11, there will be described a method of calculating a maximum amplitude value and a Z-position (relative distance) corresponding to the maximum amplitude value by use of Hilbert transform. FIG. 7 is a flowchart for calculating the maximum amplitude value and the height information using Hilbert transform. FIG. 8 to FIG. 11 are graphs corresponding to steps shown in FIG. 7.

Figure 8:
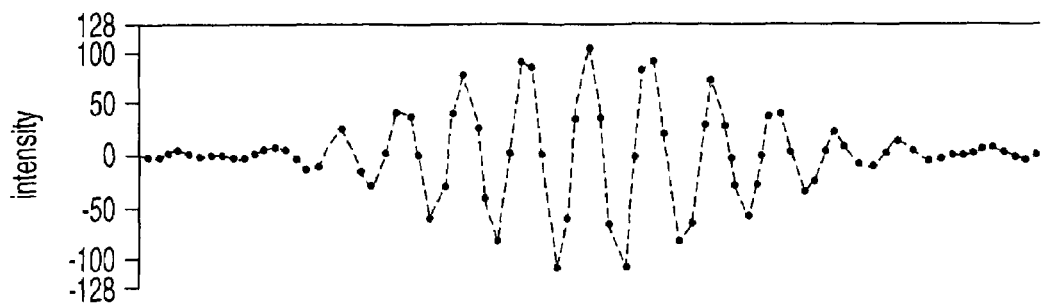
FIG. 8 is a graph showing a curve joining subtracted color luminance data IG' (x, y) generated in Step 31 shown in FIG. 7.

First, the first calculation unit 11b subtracts a DC component of the G luminance data IG (x, y), and generates subtracted color luminance data IG' (x, y) (Step 31). FIG. 8 is a graph showing a curve joining the subtracted color luminance data IG' (x, y) generated in Step 31.

Figure 9:
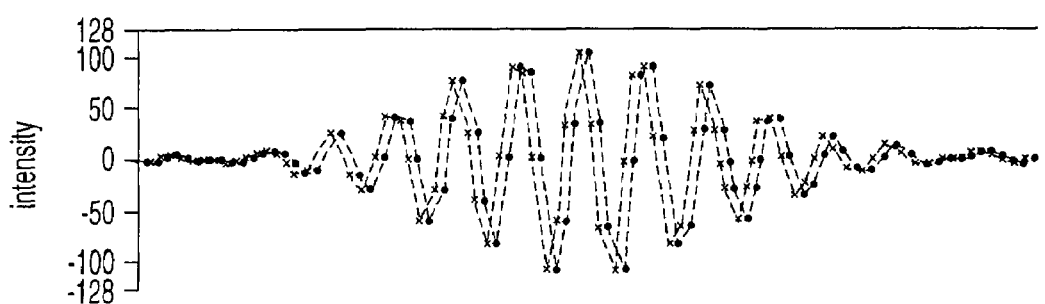
FIG. 9 is a graph showing the curve of the subtracted color luminance data IG' (x, y) shown in FIG. 8 and a curve joining color G luminance data HG (x, y) generated by Hilbert transformation in Step 32 shown in FIG. 7.

Next, the first calculation unit 11b performs Hilbert transformation for the subtracted color luminance data IG' (x, y). This generates color G luminance data HG (x, y) whose phase is different 90° from that of the subtracted color luminance data IG' (x, y) (Step 32). FIG. 9 is a graph showing the curve of the subtracted color G luminance data IG' (x, y) shown in FIG. 8 and a curve joining the color G luminance data HG (x, y) generated by Hilbert transformation in Step 32.

Next, the first calculation unit 11b substitutes the subtracted color G luminance data IG' (x, y) and the color G luminance data HG (x, y) in the following expression, thereby calculating an amplitude AG (x, y) (Step 33).

$$AG(x,y) = \sqrt{\{IG'(x,y)\}^2 + \{HG(x,y)\}^2}$$

Figure 10:
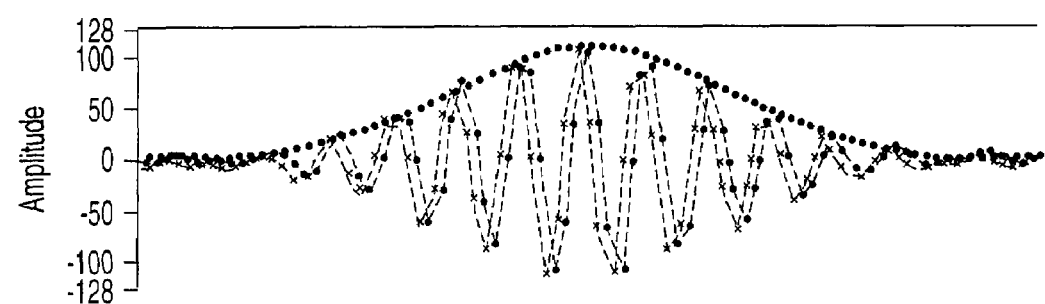
FIG. 10 is a graph showing the two curves shown in FIG. 9 and plotted points of amplitudes calculated in Step 33 shown in FIG. 7.

FIG. 10 is a graph showing the two curves shown in FIG. 9 and plotted points of the amplitudes calculated by the expression in Step 33.

Figure 11:
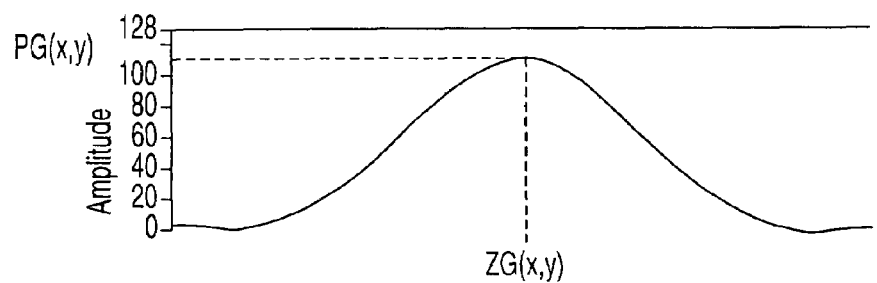
FIG. 11 is a graph showing an envelope (amplitude curve) joining the plotted points of the amplitudes shown in FIG. 10.

Next, the first calculation unit 11b performs interpolation processing (Step 34). The arithmetic processing unit 11 obtains a graph showing an envelope (amplitude curve) joining the plotted points of the amplitudes shown in FIG. 10, as shown in FIG. 11. The first calculation unit 11b calculates a maximum amplitude value PG (x, y) from this graph (Step 35). Moreover, the second calculation unit 11d calculates a Z-position ZG (x, y) corresponding to this maximum amplitude value (Step 36).

Thus, the arithmetic processing unit 11 calculates the maximum amplitude value and the Z-position (relative distance) corresponding to the maximum amplitude value by use of the Hilbert transformation method.

Next, referring to FIG. 12 to FIG. 15, there will be described a method of calculating a maximum amplitude value and a Z-position (relative distance) corresponding to the maximum amplitude value by use of the low pass filter. FIG. 12 is a flowchart for calculating a maximum amplitude value and a Z-position (relative distance) corresponding to the maximum amplitude value using the low pass filter. FIG. 13 to FIG. 15 are graphs corresponding to steps shown in FIG. 12.

First, the first calculation unit 11b subtracts the DC component of the G luminance data IG (x, y), and generates subtracted color G luminance data IG' (x, y) (Step 41). FIG. 13 is a graph showing a curve joining the subtracted color G luminance data IG' (x, y) generated in Step 41.

Next, the first calculation unit 11b substitutes the subtracted color G luminance data IG' (x, y) in the following expression (Step 42).

$$\sqrt{\{IG'(x,y)\}^2}$$

Then, the first calculation unit 11b can obtain a curve indicated in a graph as shown in FIG. 14.

The first calculation unit 11b subjects this curve to the low pass filter to only extract low frequency components (gentle change), thereby detecting a discrete value (Step 43). Further, the first calculation unit 11b provides gauss fit to this discrete value (Step 44). Thus, the first calculation unit 11b can obtain a curve as shown in FIG. 15.

The first calculation unit 11b calculates a maximum amplitude value PG (x, y) from this curve (Step 45). The second calculation unit 11d calculates a Z-position (relative distance) ZG (x, y) corresponding to this maximum amplitude value (Step 46).

Thus, in the arithmetic processing unit 11, the first calculation unit 11b and the second calculation unit 11d calculate the maximum amplitude value and the Z-position (relative distance) corresponding to the maximum amplitude value using the low pass filter.

Furthermore, instead of the calculation method described above, the arithmetic processing unit 11 can also employ a calculation method in which the image pickup step distance Δ is sufficiently decreased so that a maximum amplitude value and a minimum amplitude value are directly found from the interferogram in the color luminance data I (x, y) to calculate a Z-position corresponding to the maximum amplitude value.

Figure 16:
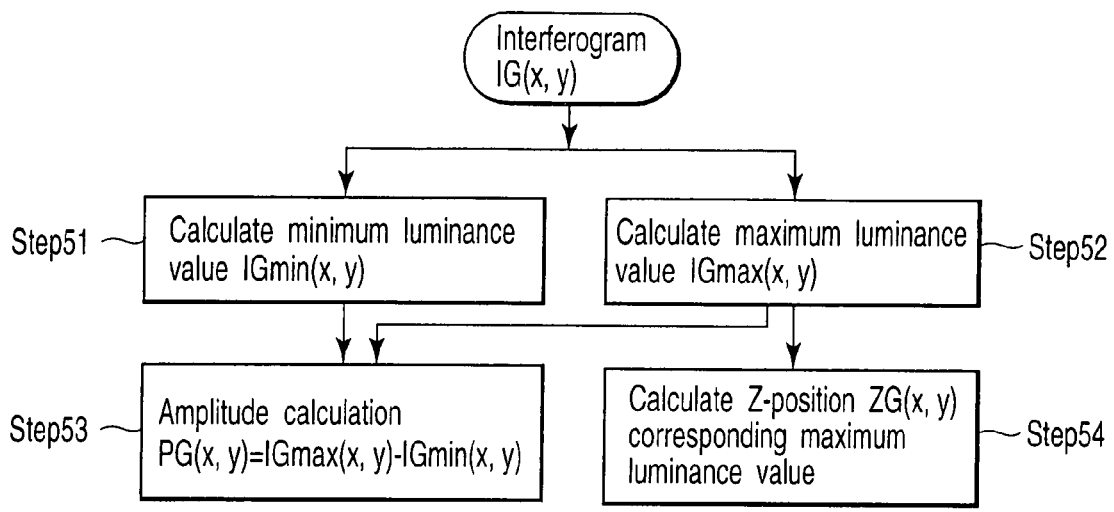
FIG. 16 is a flowchart showing a method of obtaining a maximum value and a minimum value of color luminance data I (x, y) to calculate a Z-position corresponding to a maximum amplitude value.
Figure 17:
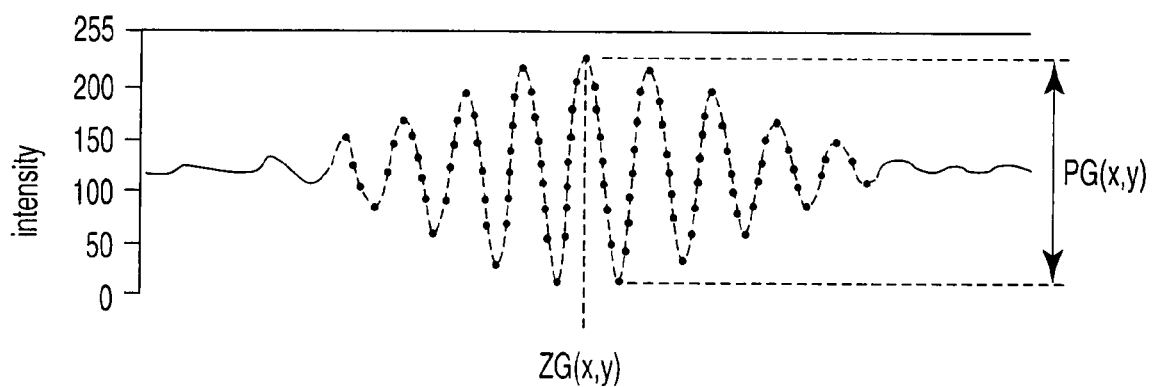
FIG. 17 is a graph used when the maximum amplitude value and the Z-position providing the maximum amplitude value are calculated from the maximum value and the minimum value of the color luminance data I (x, y)

FIG. 16 is a flowchart showing a method of calculating a maximum value and a minimum value of the color luminance data I (x, y) to calculate a Z-position corresponding to the maximum value. FIG. 17 is a graph used when the maximum amplitude value and the Z-position (relative distance) providing the maximum amplitude value are calculated from the maximum value and the minimum value of the color luminance data I (x, y).

As shown in FIG. 16, the first calculation unit 11b directly calculates a minimum luminance value IGmin (x, y) and a maximum luminance value IGmax (x, y) from the interferogram in the G luminance data IG (x, y) (Step 51 and Step 52).

Next, the first calculation unit 11b subtracts the minimum luminance value IGmin from and the maximum luminance value IGmax (x, y), and calculates a maximum amplitude value PG (x, y) from a difference therebetween (Step 53).

Furthermore, the second calculation unit 11d calculates a Z-position ZG (x, y) corresponding to the maximum luminance value IGmax (x, y) (Step 54).

When the arithmetic processing unit 11 acquires the color omnifocal image in Step 26 and calculates the height information for the sample 1 in Step 28, the composing unit 11c composes the height information and the color omnifocal image. The display unit 15 displays an image having the height information, the color omnifocal image, and a composite image (Step 10).

Figure 18A:
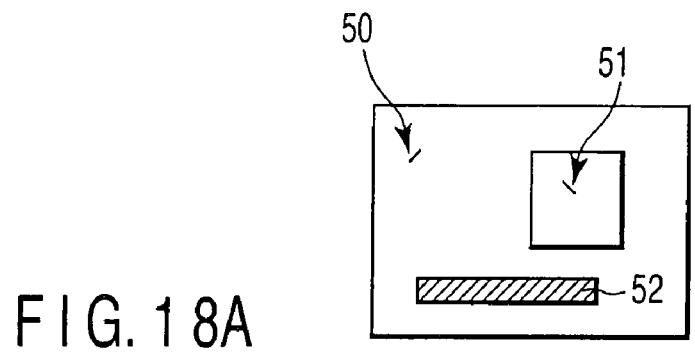
FIG. 18A shows a display example of a color omnifocal image for all the positions of a sample.
Figure 18B:
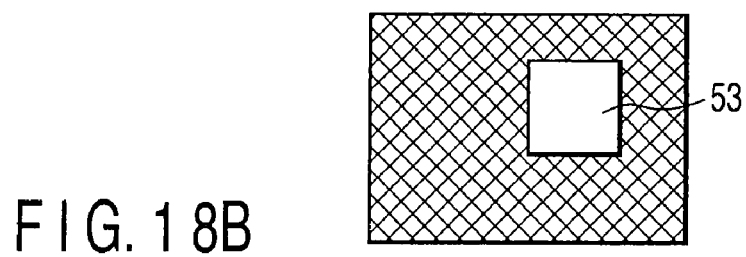
FIG. 18B shows a display example of height information for the sample.
Figure 18C:
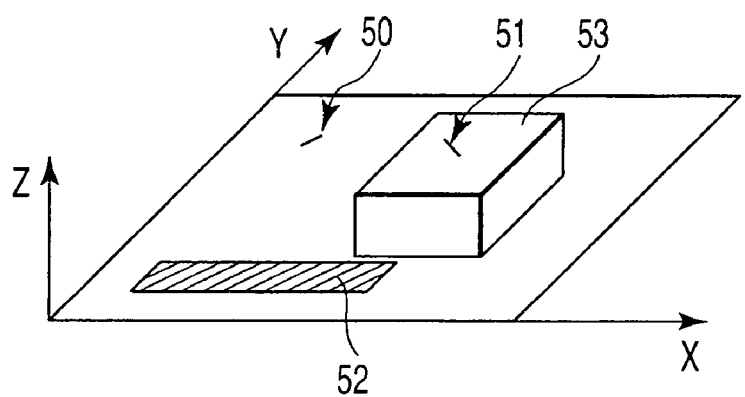
FIG. 18C is a three-dimensionally shaped image of the sample which is a composition of the color omnifocal image shown in FIG. 18A and the height information shown in FIG. 18B.

Next, the height information for the sample 1 and the color omnifocal image thereof that are displayed will be described referring to FIG. 18A, FIG. 18B and FIG. 18C. FIG. 18A shows a two-dimensional image displayed in accordance with the result in Step 26. FIG. 18B shows a two-dimensional image displayed in accordance with the result in Step 28. FIG. 18C shows a three-dimensional image displayed in accordance with the result of composing the results in Step 26 and Step 28 (the image in FIG. 18A is superposed on the image in FIG. 18B), which is displayed in Step 10 described above.

More specifically, FIG. 18A shows a display example of the color omnifocal image focused on all the positions of the sample 1. FIG. 18B shows a display example of the height information for the sample 1. FIG. 18C shows the three-dimensional image of the sample 1 in which the results in FIG. 18A and FIG. 18B are composed.

The two-dimensional image shown in FIG. 18A is provided with contrast (color luminance information) obtained in Step 26 in accordance with the color of the sample 1 and the micro-shape of the surface of the sample 1. Micro-flaws 50 and 51 and a different composition portion 52 with clear contrast are identified by this image.

The two-dimensional image with bright and dark colors shown in FIG. 18B shows a difference in height between the surface of the sample 1, the micro-flaws 50 and 51 and the different composition portion 52, and a projecting portion 53, in accordance with the height information for the sample 1 obtained in Step 28. For example, the difference in height is clear from the difference of thickness between the surface of the sample 1 and the projecting portion 53. However, the micro-flaws 50 and 51 and the different composition portion 52 are not easily displayed by the thickness because they are slightly different in height from the surface of the sample 1.

FIG. 18C shows a bird's-eye view which composes and cubically (three-dimensionally) showing the color omnifocal image shown in FIG. 18A and the height information shown in FIG. 18B. This allows the micro-flaws 50 and 51, the different composition portion 52 and the projecting portion 53 to be clearly measured.

Thus, in the present embodiment, it is possible to obtain the color omnifocal image focused on the whole sample as shown in FIG. 18A as well as the image having the height information shown in FIG. 18B. Moreover, in the present embodiment, the two images are composed, so that the three-dimensionally shaped image as shown in FIG. 18C can be obtained. Thus, the present embodiment enables the micro-change in the shape of the sample 1, color information, the difference of composition, etc., to be clearly measured at the same time.

Next, a first modification in the present embodiment will be described referring to FIG. 19.

Figure 19:
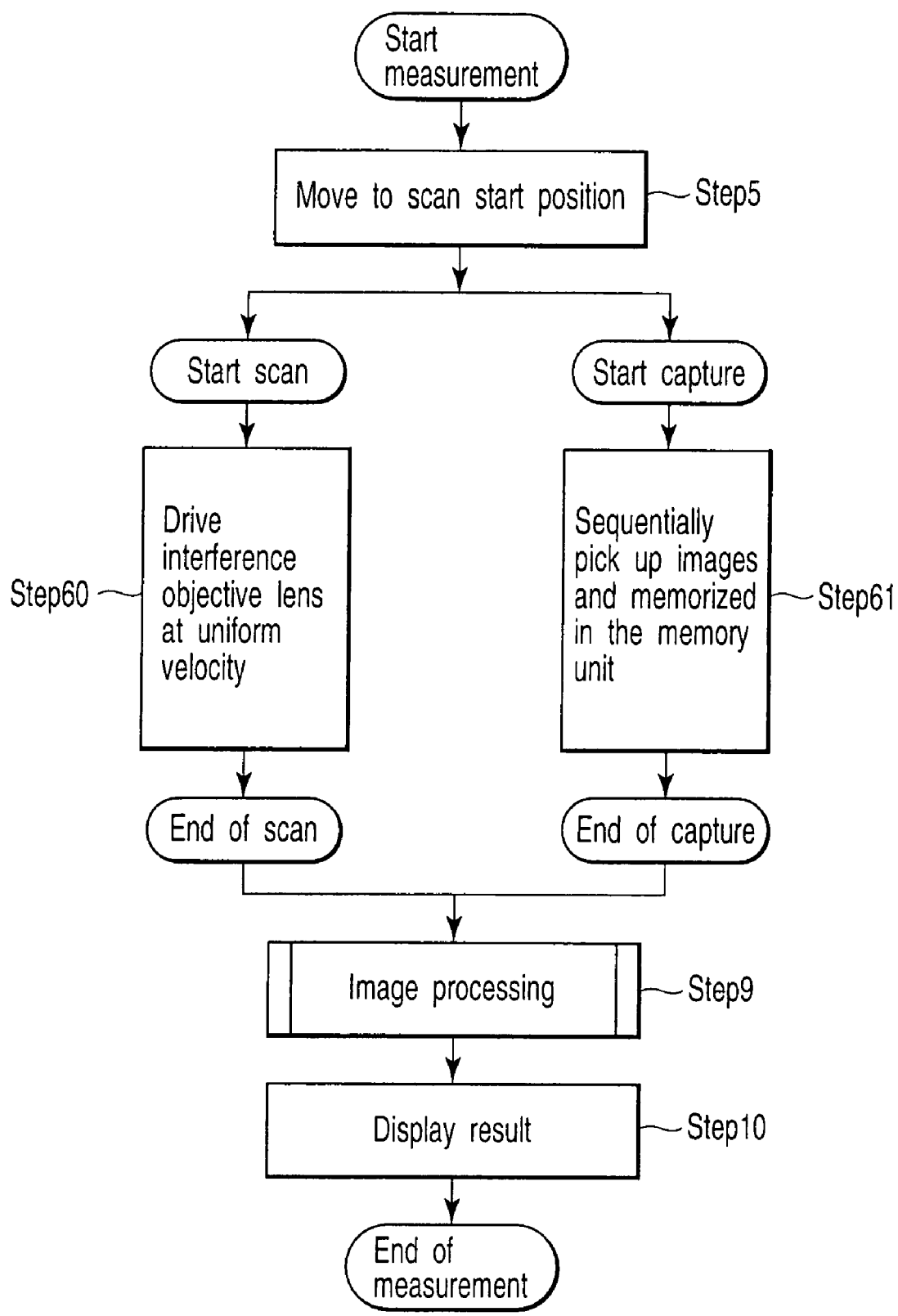
FIG. 19 is a flowchart in a first modification.

FIG. 19 is a flowchart in the first modification. It is to be noted that, in the flowchart shown in FIG. 19, the same signs are assigned to the same processing parts as those in the flowchart shown in FIG. 3, and these parts are not described in detail. The configuration in the present modification is the same as that in the first embodiment described above. In addition, a series of operations from the start to the end of setting in the present modification is similar to the operations in Step 1 to Step 4 in the first embodiment described above, and these operations are not described in detail.

In the first embodiment described above, the operation of moving the interference objective lens 2 in the Z-axis direction by the Z-scan mechanism 3 (Step 6) and the image pickup operation by the color image pickup device 5 (Step 7) are alternately carried out until the interference objective lens 2 is moved to the Z-scan end position. However, these operations (Step 60 and Step 61 in the present modification) may be rearranged so that they are carried out in parallel as shown in FIG. 19.

In the present modification, a scan and capture are simultaneously started after the completion of Step 5. The scan means that the Z-scan mechanism 3 moves the interference objective lens 2 at a uniform velocity v (μm/s) along the optical axis 16 (the interference objective lens 2 is driven at a uniform velocity) (Step 60). The capture means that the color image pickup device 5 performs sequential image pickup at a frame rate of this color image pickup device 5 and that image data items are sequentially memorized in the memory unit 12 by way of the image input unit 10 (Step 61). The processing in Step 60 and the processing in Step 61 are carried out in parallel. The scan and the capture terminate simultaneously.

For example, when the image pickup step distance Δ is set at 70 nm, the velocity v at which the Z-scan mechanism 3 moves is 2.1 μm/s if the frame rate of the color image pickup device 5 is set at 30 frame/s.

Thus, in the present modification, the uniform velocity of the movement or the frame the color image pickup device 5 are arbitrarily set such that image data can be obtained at arbitrary desired intervals.

In addition, in the present modification, the shutter speed of the color image pickup device 5 can be increased during the image pickup, such that an instantaneous interference state can be imaged even if the imaging is performed while the Z-scan mechanism 3 is moving at a uniform velocity.

Figure 3:
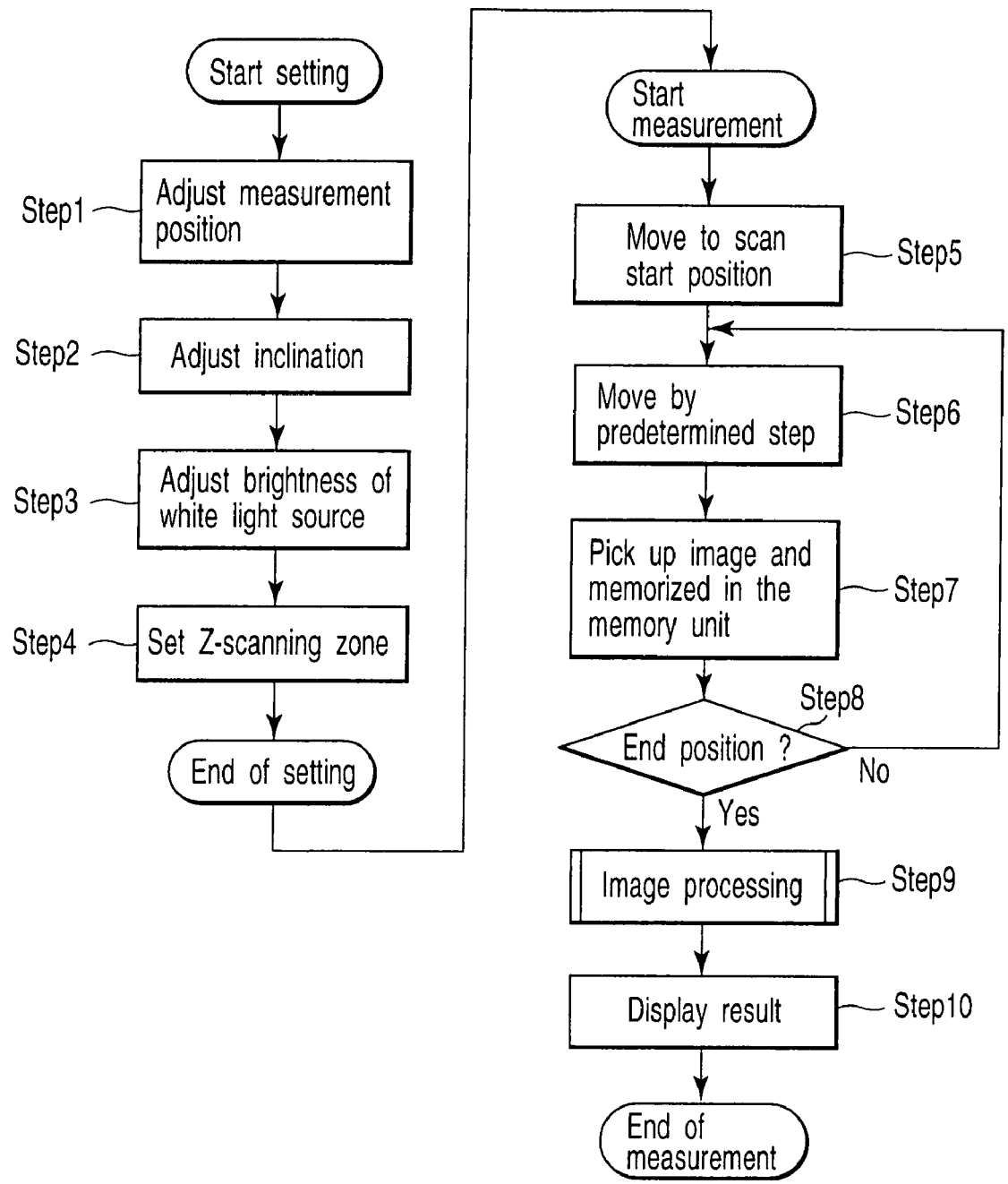
FIG. 3 is a flowchart regarding the operation of the three-dimensional shape measurement apparatus.

After the scan and the capture (Step 60 and Step 61) are finished, the present modification carries out Step 9 and Step 10 as in the flowchart shown in FIG. 3.

Thus, in the present modification, effects similar to those in the first embodiment described above can be obtained, and the Z-scan mechanism 3 does not need to stop the scam operation because the color image pickup device 5 images the sample 1. Thus, the present modification makes it possible to reduce measurement time.

Furthermore, the Z-scan mechanism 3 moves the interference objective lens 2 at the uniform velocity v (μm/s), such that the Z-scan mechanism 3 can be inexpensive because no highly precision is required in the stop position.

Next, a second modification in the present embodiment will be described referring to FIGS. 20A and 20B.

Figure 20B:
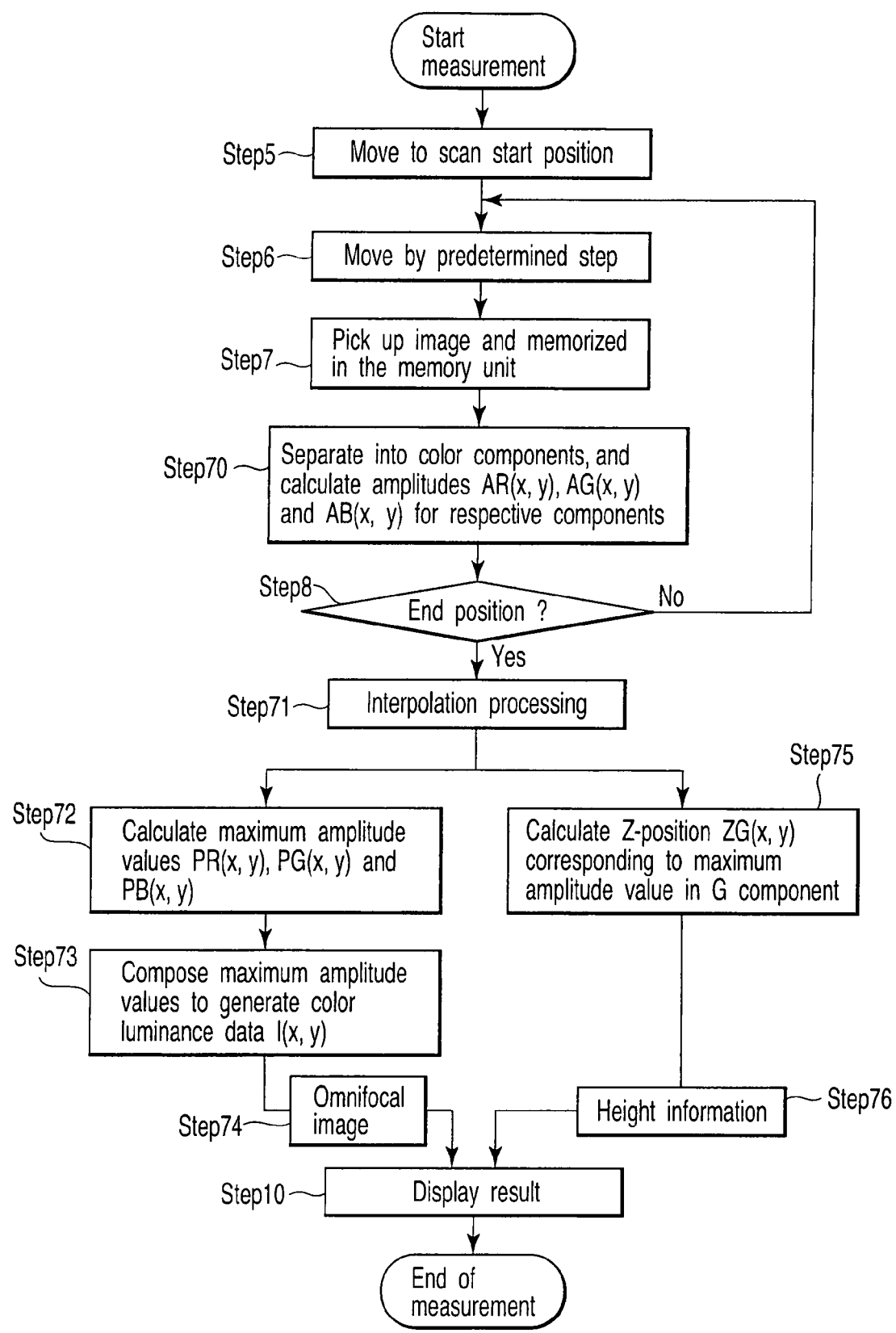
FIG. 20B is a flowchart in the present embodiment.

FIG. 20A is a diagram of the configuration of an arithmetic processing unit in the second modification. FIG. 20B is a flowchart in the second modification. It is to be noted that, in the flowchart shown in FIG. 20B, the same signs are assigned to the same processing as that in the flowchart shown in FIG. 3, and these parts are not described in detail. The configuration in the present modification is the same as that in the first embodiment described above. In addition, a series of operations from the start to the end of setting in the present modification is similar to the operations in Step 1 to Step 4 in the first embodiment described above, and these operations are not described in detail.

In addition, an arithmetic processing unit 11 in the present modification processes various calculations (images) on the basis of information output from the image input unit 10 and the memory unit 12 as in the first embodiment. This arithmetic processing unit 11 has a separating unit 11a, a first calculation unit 11b, a composing unit 11c, a second calculation unit 11d and a third calculation unit 11e, for processing the various calculations (images).

In the present modification, Step 70 is provided between Step 7 and Step 8. In Step 70, the arithmetic processing unit 11 separates color luminance data I (x, y) into color components (R, G and B) of a color image, and sequentially calculates amplitude for the separated components.

More specifically, the color image pickup device 5 picks up an image for, for example, an m-th frame in Step 7. The memory unit 12 memorizes image data for the m-th frame. The memory unit 12 has already memorized image data for an m−1-th frame, an m−2-th frame, an m−3-th frame, . . . a first frame, in addition to the image data for the m-th frame.

Next, the separating unit 11a separates color luminance data I (x, y) in the image data for the m-th frame into color components (R, G and B) of the color image. After the separation, the first calculation unit 11b calculates amplitudes AR (x, y), AG (x, y) and AB (x, y) of the color components of the m-th frame by use of the Hilbert transformation method described above with reference to FIG. 7 (Step 70).

The first calculation unit 11b generally uses the Hilbert transformation method for all the image data memorized in the memory unit 12 in order to calculate the amplitudes of the color components of the m-th frame. However, the first calculation unit 11b in the present modification uses the Hilbert transformation method for the image data of the latest n frames (the present modification is explained assuming n=8) shown in FIG. 21A, FIG. 21B and FIG. 21C to save calculation time, and calculates the amplitude for the m-th frame.

Figure 21A:
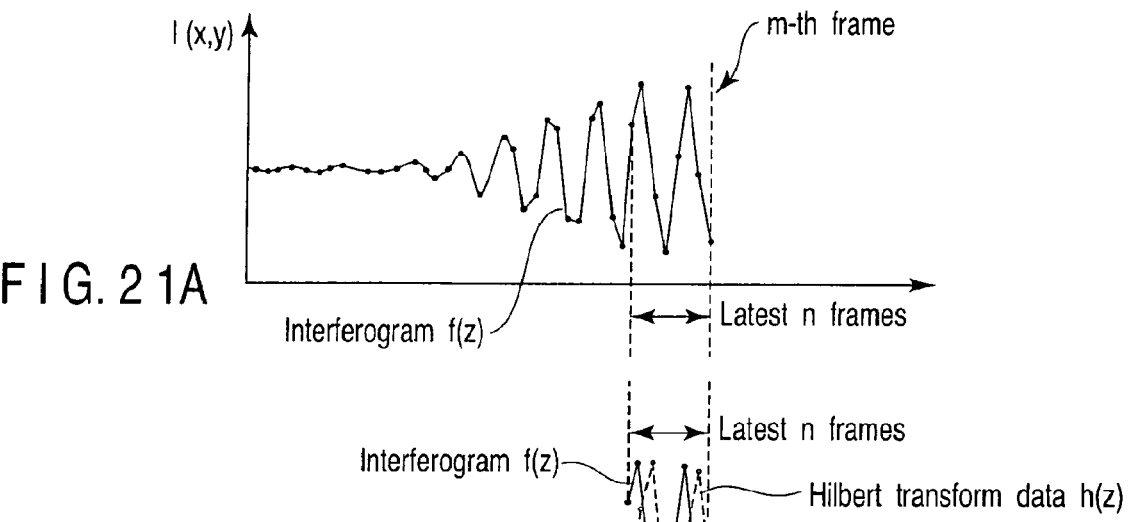
FIG. 21A shows an interferogram of one color component memorized in the memory unit up to an m-th frame.
Figure 21C:
FIG. 21C is a graph in which an amplitude A(z) of the latest 8 frames is calculated from an arithmetic expression, and the result of calculating an amplitude A(m) of the m-th frame is added to a past amplitude calculation result.
Figure 21B:
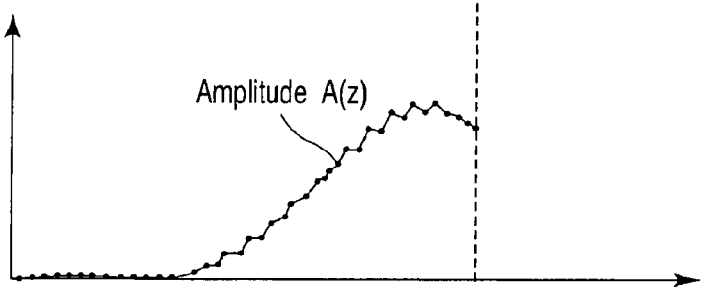
FIG. 21B shows an interferogram f(z) for the latest 8 frames and data h(z) generated by Hilbert transformation.
Figure 22:
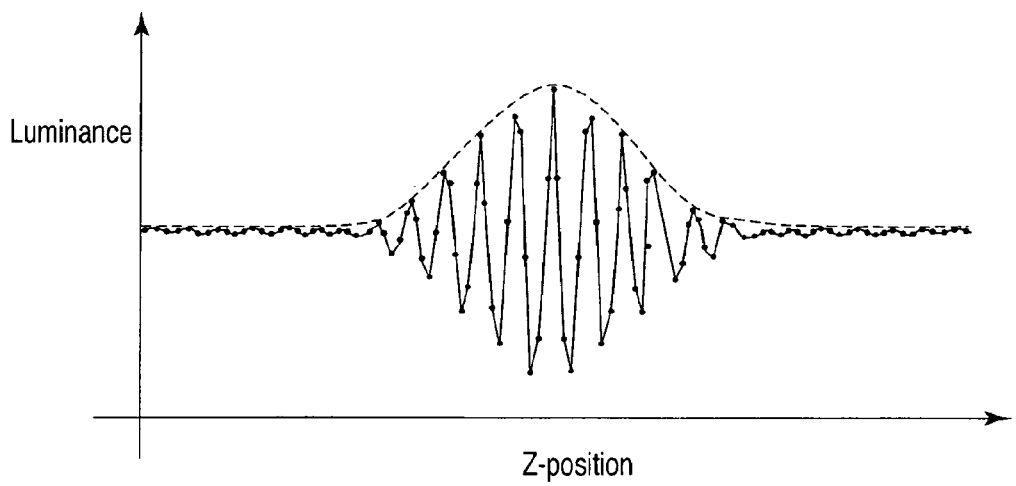
FIG. 22 is a diagram showing a conventional interferogram.

FIG. 21A shows an interferogram of one color component memorized in the memory unit 12 up to the m-th frame. FIG. 21B shows an interferogram f(z) for the latest 8 frames and Hilbert transformation data h(z) generated by Hilbert transformation. FIG. 21C is a graph in which the first calculation unit 11b calculates an amplitude A(z) of the latest 8 frames from the following arithmetic expression, and the result of calculating an amplitude A(m) of the m-th frame is added to a past amplitude calculation result.

$$A(z) = \sqrt{\{f(z)\}^2 + \{h(z)\}^2}$$

As described above, in the present modification, the calculations explained referring to FIG. 21A, FIG. 21B and FIG.

21C are performed for the respective color components in Step 70, and the amplitude is calculated during a Z-axis scan.

When the scan is finished in Step 8, the first calculation unit 11b performs interpolation processing for the discrete amplitude A(z) obtained in Step 70 (Step 71). Then, the second calculation unit 11d calculates maximum amplitude values PR (x, y), PG (x, y) and PB (x, y) from interpolated data for the respective color components (Step 72). The composing unit 11c composes the calculated maximum amplitude values to generate color luminance data I (x, y) (Step 73). Thus, the arithmetic processing unit 11 obtains a color omnifocal image (Step 74).

Furthermore, the third calculation unit 11e calculates a Z-position corresponding to the maximum amplitude value in Step 72 for at least one of the color components (the G component in the present modification) (Step 75). The arithmetic processing unit 11 performs this processing for all pixels (x, y) to calculate height information for the sample 1 (Step 76).

When the arithmetic processing unit 11 acquires the color omnifocal image in Step 74 and calculates the height information for the sample 1 in Step 28, the composing unit 11c composes the height information and the color omnifocal image. The display unit 15 displays an image having the height information, the color omnifocal image, and a composite image (Step 10).

Thus, in the present modification, the calculations of the amplitudes requiring a relatively heavy load (Step 70) are sequentially performed during a loop of loading a scan image which imposes a light load on the arithmetic processing unit 11 (Step 6 to Step 8). Thus, the present modification makes it possible to increase the operating rate of the arithmetic processing unit 11 and reduce the time required in the whole measurement.

Furthermore, the Hilbert transformation method is used as a amplitude calculation method in the present modification. However, this is not a limitation, and any amplitude calculation method using an arithmetic technique may be employed.

Still further, the amplitude calculation processing is performed in the order of Steps 6, 7 and 70. However, this is not a limitation, and the order may be changed as long as an image is being acquired.

In the embodiment of the present invention, the interference objective lens is moved in the optical axis direction by the Z-scan mechanism 3 to change the relative distance between the sample 1 and the reference surface. However, this is not a limitation, and, for example, the stage may be moved to move the sample 1 in the optical axis direction.

Alternatively, the whole microscope optical system except for the sample 1 may be moved. That is, any scanning method may be used as long as it changes the optical path difference between measurement light of the interference optical system and reference light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional shape measurement method which applies light emitted from a light source to a sample and a reference surface and which images an interference figure produced from lights reflected from the sample and the reference surface to measure the three-dimensional shape of the sample, the method comprising:

adjusting the relative distance between the sample and the reference surface;

sequentially imaging the interference figures to acquire color interference images every time the relative distance is changed;

separating the acquired color interference images into color components;

calculating a maximum amplitude value from each interference waveform for each of the separated color components;

composing only the calculated maximum amplitude values to generate color luminance data while obtaining a color omnifocal image by generating the color luminance data of all pixels; and displaying the obtained color omnifocal image.

2. The three-dimensional shape measurement method according to claim 1, wherein the relative distance corresponding to the maximum value is calculated for at least one color component in the interference waveform.

3. The three-dimensional shape measurement method according to claim 2, wherein height information for the sample and the color omnifocal image are composed and displayed when the three-dimensional shape is displayed on the basis of the height information, where the relative distance is the height information.

4. The three-dimensional shape measurement method according to claim 1, wherein the light source has an incoherent light source.

5. The three-dimensional shape measurement method according to claim 1, wherein the color components have red (R), green (G) and blue (B) components.

6. The three-dimensional shape measurement method according to claim 1, wherein the interference figures are sequentially imaged and the color interference images at desired intervals are acquired when the relative distance is changed at a uniform velocity.

7. The three-dimensional shape measurement method according to claim 1, wherein the interference waveform f(z), and Hilbert transformation data h(z) generated by subjecting the interference waveform f(z) to Hilbert transformation arc calculated, and the amplitude A(z) is calculated from the following arithmetic expression:

$$A(z)=\sqrt{\{f(z)\}^2+\{h(z)\}^2}.$$

8. A three-dimensional shape measurement method which applies light emitted from a light source to a sample and a reference surface and which images an interference figure produced from lights reflected from the sample and the reference surface to measure the three-dimensional shape of the sample, the method comprising:

adjusting the relative distance between the sample and the reference surface;

sequentially imaging the interference figures to acquire color interference images every time the relative distance is changed;

separating the acquired color interference images for a latest m frames into color components;

calculating amplitude of the latest frame for each color component from an interference waveform for the latest m frames for each of the separated color components;

calculating a maximum value of the amplitude for each color component;

composing only the calculated maximum amplitude values to generate color luminance data while obtaining a color omnifocal image by generating the color luminance data of all pixels; and displaying the obtained color omnifocal image.

9. The three-dimensional shape measurement method according to claim 8, wherein the relative distance corresponding to the maximum value is calculated for at least one color component in the interference waveform.

10. The three-dimensional shape measurement method according to claim 9, wherein height information for the sample and the color omnifocal image are composed and displayed when the three-dimensional shape is displayed on the basis of the height information, where the relative distance is the height information.

11. The three-dimensional shape measurement method according to claim 8, wherein the light source has an incoherent light source.

12. The three-dimensional shape measurement method according to claim 8, wherein the color components have red (R), green (G) and blue (B) components.

13. The three-dimensional shape measurement method according to claim 8, wherein the interference figures are sequentially imaged and the color interference images at desired intervals are acquired when the relative distance is changed at a uniform velocity.

14. The Three-dimensional shape measurement method according to claim 8, wherein the interference waveform f(z) for the latest m frames, and Hubert transformation data h(z) generated by subjecting the interference waveform f(z) to Hilbert transformation are calculated, and the amplitude A(z) is calculated from the following arithmetic expression:

$$A(z)=\sqrt{\{f(z)\}^2+\{h(z)\}^2}.$$

15. A three-dimensional shape measurement apparatus which applies light emitted from a light source to a sample and a reference surface and which images an interference figure produced from lights reflected from the sample and the reference surface to measure the three-dimensional shape of the sample, the apparatus comprising:

a drive unit which adjusts a relative distance between the sample and the reference surface;

an image acquisition unit which sequentially images the interference figures to acquire color interference images every time the relative distance is changed by the drive unit;

a separating unit which separates the color interference image acquired by the image acquisition unit into color components;

a first calculation unit which calculates a maximum amplitude value for each color component from an interference waveform of the color components separated by the separating unit;

a composing unit which composes only the maximum amplitude values for the color components to generate the color luminance image while obtaining a color omnifocal image by generating the color luminance data of all pixels in the image acquisition unit; and a displaying unit which displays the color omnifocal image obtained in the composing unit.

16. The three-dimensional shape measurement apparatus according to claim 15, further comprising:

a second calculation unit which calculates the relative distance corresponding to the maximum amplitude value for at least one color component, wherein the composing unit composes the height information and the color omnifocal image; and the displaying unit displays a composed image in the composing unit when the three-dimensional shape is displayed on the basis of the height information, where the relative distance is the height information.

17. The three-dimensional shape measurement apparatus according to claim 15, wherein the first calculation unit calculates the interference waveform f(z), and Hubert transformation data h(z) generated by subjecting the interference waveform f(z) to Hilbert transformation, and calculates the amplitude A(z) from the following arithmetic expression:

$$A(z)=\sqrt{\{f(z)\}^2+\{h(z)\}^2}.$$

18. A three-dimensional shape measurement apparatus which applies light emitted from a light source to a sample and a reference surface and which images an interference figure produced from lights reflected from the sample and the reference surface to measure the three-dimensional shape of the sample, the apparatus comprising:

a drive unit which adjusts a relative distance between the sample and the reference surface;

an image acquisition unit which sequentially images the interference figures to acquire color interference images every time the relative distance is changed by the drive unit;

a separating unit which separates, into color components, the color interference images for a latest m frames acquired by the image acquisition unit;

a first calculation unit which calculates amplitude of a latest frame for each color component from an interference waveform for the latest m frames for each of the color components separated by the separating unit;

a second calculation unit which calculates a maximum value of the amplitude for each color component;

a composing unit which composes only maximum amplitude values for the color components to generate the color luminance image while obtaining a color omnifocal image by generating the color luminance data of all pixels in the image acquisition unit; and a displaying unit which displays the color omnifocal image obtained in the composing unit.

19. The three-dimensional shape measurement apparatus according to claim 18, further comprising:

a third calculation unit which calculates the relative distance corresponding to the maximum value for at least one color component in the interference waveform, wherein the composing unit composes the height information and the color omnifocal image; and the displaying unit displays a composed image in the composing unit when the three-dimensional shape is displayed on the basis of the height information, where the relative distance is the height information.

20. The three-dimensional shape measurement apparatus according to claim 18, wherein the first calculation unit calculates the interference waveform f(z) for the latest m frames, and Hilbert transformation data h(z) generated by subjecting the interference waveform f(z) to Hilbert transformation, and calculates the amplitude A(z) from the following arithmetic expression:

$$A(z)=\sqrt{\{f(z)\}^2+\{h(z)\}^2}.$$

* * * * *